Dec. 27, 1949  E. LARSON  2,492,801
DIAMOND DRILL STUFFING BOX AND CLAMP
Filed Sept. 15, 1945

Inventor.
Emanuel Larson

Patented Dec. 27, 1949

2,492,801

UNITED STATES PATENT OFFICE 2,492,801

DIAMOND DRILL STUFFING BOX AND CLAMP

Emanuel Larson, Amos, Quebec, Canada

Application September 15, 1945, Serial No. 616,599

2 Claims. (Cl. 255—51)

1

This invention relates to improvements in devices for guiding and clamping diamond drills and the principal object is to devise a simple and efficient device which will serve to guide the drill during a drilling operation and will effectively seal the hole from leakage of water around the drilling rig especially where holes are being drilled upwardly, and further, will permit the clamping of the drill while adding or removing drill lengths.

The principal features of the invention consist in the novel construction of a block adapted to be secured to a rock face having an orifice through which the drill operates packed with a stuffing box and having an internal chamber connected with said orifice and a water conduit leading therefrom, said orifice also housing a reciprocating clamp member, means being housed in the block for operating said clamp to grip or release the drill.

In the accompanying drawings—

Figure 1:
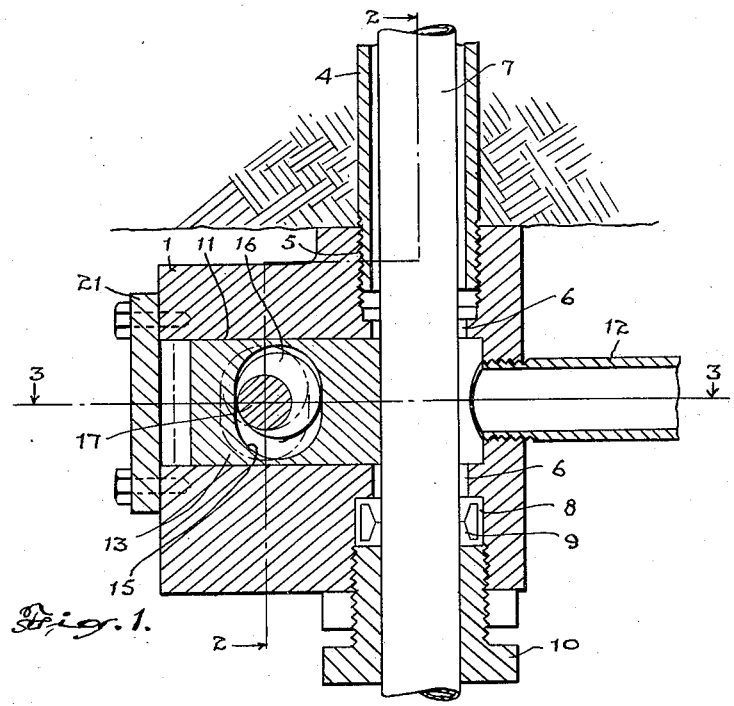
Figure 1 is a vertical longitudinal mid-sectional view of my improved stuffing box and clamp.
Figure 2:
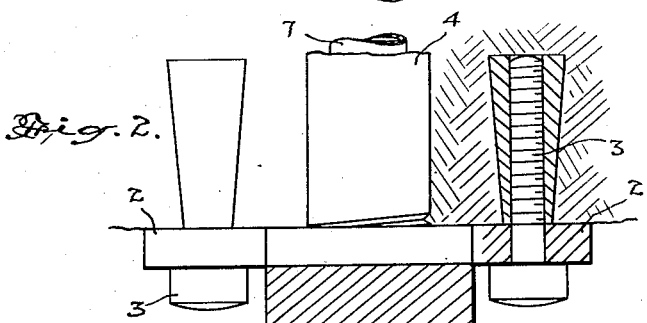
Figure 2 is a part vertical sectional view through the line 2—2 of Figure 1.
Figure 3:
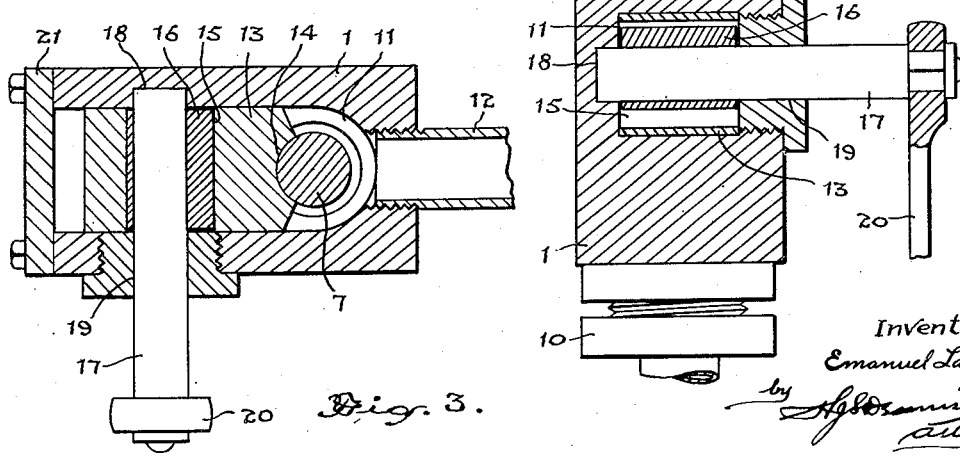
Figure 3 is a horizontal section through the line 3—3 of Figure 1.

In the operation of diamond drills it is customary to direct a flow of water through the tubular drill and the water flows back between the drill and the wall of the rock which has been cut. When holes are being drilled upwardly from an underground position this return flow of water interferes materially with the operation of the drilling equipment and the present invention has been devised particularly to overcome these undesirable conditions and similar objectionable conditions where holes are being drilled in locations where ready clearance of the overflow water is not effective.

The device illustrated in the accompanying drawings comprises a metal block 1 of substantially rectangular form having a pair of laterally extending lugs 2 through which suitable wedge bolts 3 are inserted to extend into the rock face where the hole is being driven.

A length of pipe 4 is secured in a threaded orifice 5 in the top of the block between the side lugs and a circular orifice 6 extends downwardly in alignment with said pipe and forms an orifice through which the tubular diamond drill rod 7 extends.

The lower end of the orifice 6 is provided with a counterbore 8 in which a suitable gasket 9 is housed to surround the drill rod. This gasket

2 is indicated as a hollow double-flanged rubber gasket but any desired form of gasket may be used.

The lower end of the orifice is threaded to receive the adjustable packing nut 10 for applying compression pressure against the gasket.

A chamber 11 is formed in the block 1 to intersect the vertical orifice 6 intermediate of its length. This chamber may be formed by boring horizontally inward from one end of the block or it may be broached or otherwise formed with a rectangular cross section and the inner end forms a chamber to receive the return water flowing around the drill rod through the pipe 4.

A pipe 12 is secured in a threaded opening in the block connecting with the chamber 11 and conducts the overflow water to a suitable location for discharging the water clear of the drilling equipment.

A block 13 slidably arranged in the chamber 11 remote from the discharge pipe 12 is formed with a part cylindrical face 14 of a radius corresponding with the radius of the drill rod 7 and is adapted to form a clamp adapted to grip and hold the drill rod.

The block 13 is provided with a transverse orifice 15 here shown of elongated cross section and an eccentric 16 mounted on a spindle 17 is arranged within said orifice to move the block 13 longitudinally within the chamber 11.

One end of the spindle 17 is journalled in a bearing orifice 18 formed in one inner side wall of the chamber 11 and the opposite end is journalled in an orifice in a block 19 threaded into the side wall opposite to the bearing 18. The outer end of the spindle 17 has secured thereto a suitable operating handle 20 by means of which the spindle is rotated to move the perimeter of the eccentric 16 into pressure engagement with either the inner or outer bearing surface of the orifice 15 and thereby moving the block 13 into or out of clamping engagement with the drill rod.

The outer end of the chamber 11 is sealed by a suitable cover 21.

In the use of this device a short hole is first bored in the rock face into which the pipe 4 is inserted and the block is then secured in position tightly against the face. A suitable packing to make the joint water-tight may be placed between the block and the rock face.

The drill is inserted through the block and the packing gland adjusted to allow free movement of the drill but to prevent the escape of water around the drill and the water used in operating the drill is directed into the chamber 11 and conducted therefrom by the pipe 12.

The spindle will of course be operated to retract the clamping block to the outward end of the chamber 11 to clear the drill rod and the drilling operation proceeds.

When it is desired to add drill lengths to the rod 7 or to remove lengths therefrom it is merely necessary to operate the handle 20 and move the clamping block into engagement with the drill rod and the eccentric 16 with its arc-shaped face engages and clamps the rod securely without marring the surface of the rod.

When the rod is thus held securely the desired adjustments can be made without the inconvenience of waste water flooding the operations and when the adjustments are completed the clamp is released so that drilling may be resumed.

The apparatus herein described is extremely simple but highly efficient in operation and it is easily and quickly placed in position for service.

What I claim as my invention is:

1. A diamond drill rod clamp for holding a drill rod in a drill hole comprising an outer block having a bore through which the drill rod extends, means for securing said block to the rock face, a chamber within said block open to said bore, a block slidably arranged in said chamber adapted to engage and hold the drill, and means mounted in the outer block and extending transversely through said slidable block adapted to reciprocate said slidable block into and out of clamping engagement with the drill rod.

2. A diamond drill rod clamp for holding a drill rod in a drill hole comprising an outer block having a bore through which the drill rod extends, wedge means for securing said block to the rock face, a chamber formed in said block intersecting said bore intermediate of its length, a block slidable in said chamber and adapted to engage and grip the drill rod and having an elongated transverse opening therethrough and a spindle having an eccentric portion operating in said elongated opening to reciprocate said clamping block into and out of clamping engagement with said drill rod to enable the drill rod to be held in position in the drill hole.

EMANUEL LARSON.

REFERENCES CITED

The following references are of record in the file of this patent:

UNITED STATES PATENTS

| Number | Name | Date |
|---|---|---|
| 33,899 | Morrill | Dec. 10, 1861 |
| 306,588 | Cronin | Oct. 14, 1884 |
| 316,031 | Haney | Apr. 21, 1885 |
| 1,196,266 | Nelson | Aug. 29, 1916 |
| 1,342,870 | Robichaux et al. | June 8, 1920 |
| 1,528,610 | Hackett | Mar. 3, 1925 |
| 2,136,190 | Gulfelt | Nov. 8, 1938 |
| 2,167,220 | Schemel | July 25, 1939 |
| 2,270,334 | Paget | Jan. 20, 1942 |